March 10, 1925.

B. VILMANYI

AUTOMOBILE SLEIGH

Filed March 31, 1923

1,529,227

BARBALA VILMANYI
Inventor

By her Attorney Julian J. Vithal

Patented Mar. 10, 1925.

1,529,227

UNITED STATES PATENT OFFICE.

BARBALA VILMANYI, OF ROEBLING, NEW JERSEY.

AUTOMOBILE SLEIGH.

Application filed March 31, 1923. Serial No. 629,160.

*To all whom it may concern:*

Be it known that I, BARBALA VILMANYI, a citizen of Hungary, and residing at P. O. Box 382, Roebling, New Jersey, have invented a new and useful Improvement in Automobile Sleighs, of which the following is a specification.

This invention relates to self-propelled vehicles and has for its main object to provide a sleigh which could be run on ice or frozen snow by its own power without any exterior force.

Another object of this invention is to provide simple and efficient and quick means by which a standard automobile, bicycle or similar vehicle could be transformed to self-propelling sleighs of the character mentioned above.

With the above and other objects in view, the invention mainly resides in providing sleigh runners mounted in place of the wheels of the usual automobiles or bicycles so that said vehicles may rest on such sleigh runners and in further securing toothed propelling wheels on the driving axles of said vehicles.

For a full description of the invention and the merits thereof and also to acquire a knowledge of the details of construction of the same for effecting the various results mentioned hereinbefore, reference is to be had to the following description and accompanying drawings.

While the essential and characteristic features of the invention are susceptible of modification, still the preferred embodiment of the invention is illustrated in the accompanying drawings, in which:—

Fig. 3 is a detailed view of the teeth employed in my driving wheel, while

Figure 1:
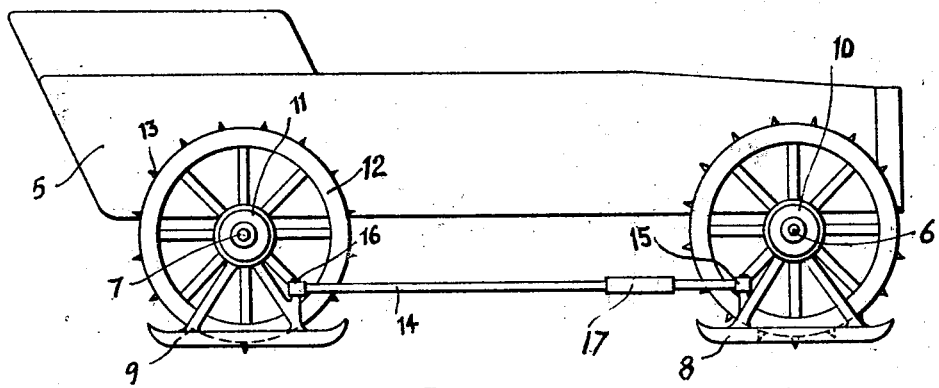
Fig. 1 is a side elevational view of an automobile of the usual make showing my sleigh runners and drive instead of its wheels.
Figure 4:
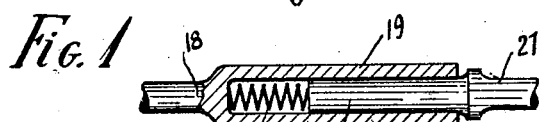
Fig. 4 is a detailed view of a joint provided in the connecting rods of my sleigh runners.

Referring more closely to the drawings, the numeral 5 indicates the automobile in general, having the usual front axle 6 and rear axle 7. The sleigh runners 8 and 9 are mounted at the ends of said axles, respectively, in place of the usual automobile wheels, which are to be removed previously. The sleigh runner 8 simply rests with its hub 10 on the outside ends of the axle 6 and may execute a right or left handed turning motion, the same way as the original front wheels of the automobile did, and thereby give the necessary direction to the movement of the vehicle. The rear sleigh runners 9 have a hub 11 of somewhat smaller widths than the original wheel of the vehicle so as to permit a narrow driving wheel 12 to be mounted on the rear axle, back of the runner 9. The hub 11 and the rear runner 9 carries a bearing of any suitable make so as to permit the rotation of the rear axle 7 therein, while the driving wheel 12 is secured to said rear axle and rotates with the same. It is obvious that upon power being applied to said rear axle 7, in any of the usual manners the driving wheel 12 will be rotated by the same and its heavy teeth 13 will sink into the ice, frozen snow or other similar ground on which said vehicle is standing, and their reaction to the rotation of wheel 12, will start the vehicle on a forward or backward silding motion on its runners 8 and 9. In order to secure a steady motion to the sleigh thus driven, the two sets of runners 8 and 9 are connected on each side of the vehicle by elastic connecting rods 14 which are pivotally applied to the two runners 8 and 9, as at 15 and 16, and have the sliding joint 16 in them, so as to permit the front runners 9 to execute their right or left handed turning motions, required by the changes and direction of the vehicle, and to cause the rear runners to follow in the same direction. The detail construction of the joint 17 is shown in Figure 4. The rear half 18 of the connecting rod 14 ends in a sleeve 19 into which slidably fits the end 20 of the forward half 21, of the connecting rod 14, and a heavy spring 22 is applied between the two halves of said connecting rod.

Figure 3:
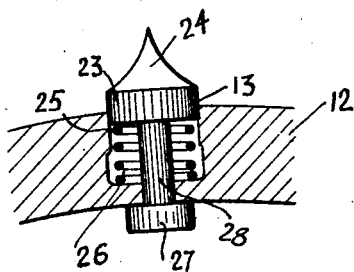

One preferred embodiment of the teeth 13, of the driving wheel 12, is shown in Figure 3. The head 23 of said teeth is formed with a pointed sharp end 24 adapted to cut and sink into the ice or frozen snow, said head slidably cooperates with a recess 25 provided in the rim of the wheel and is steadily driven outwardly by the spring 26, while a smaller head 27 may be secured on the inside end of its narrower stem 28, limiting the outward motion of said head 23. The runner 9 and the driving wheel 12 are of such dimensions that normally the weight of the vehicle will rest on the runner, while the teeth 23 will catch the ground in such a position, that the spring 26 underneath them is slightly pressed. According to the changes in the ground, said teeth might be further pushed inwardly into their recess 25 in the wheel 12 or pushed outwardly by the spring 26, underneath them, so as to always insure that the weight of the vehicle rests under the sleigh runners and that the driving wheel 12 can nevertheless always grip the ground.

Figure 2:
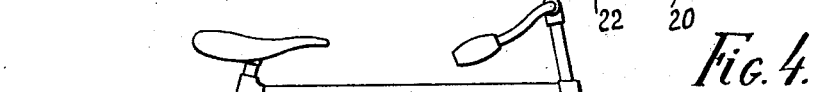
Fig. 2 is a side elevation of a standard bicycle showing my device applied thereon.

In Figure 2 I show my device applied to a bicycle of the usual make. The construction of my device and the mounting of the same on said bicycle is very similar to the one described heretofore in connection with an automobile. The forward sleigh runner 29 is applied in place of the front wheel of said bicycle, while one or two rear runners 30 may be mounted in place of the rear wheel of said bicycle and show bearings in their hubs 31, so as to permit the rotation of the rear axle of the bicycle in them. The bicycle uses the regular chain and sprocket wheel drive 32 and the rear axle 33 as a driving wheel 34 mounted thereon, similar to the one described above in connection with an automobile, only lighter in construction. The two runners may in this case again be connected by a rod 35 showing pivots 36 and a slidable joint 37, of a similar construction and for similar purposes, as hereinbefore described.

It is obvious by inspecting the drawings that my device can be manufactured with a very slight expense and can be applied to any of the vehicles of the mentioned styles by the simplest means and in the shortest time. They require practically no other changes in said vehicles than the removal of their wheels and their application to said vehicles will turn them into efficient self-propelling sleighs.

Having thus described my invention what I claim as new and want to protect by Letters Patent is:—

In a self propelled sleigh comprising a normally power driven vehicle having a front and rear axle provided with toothed wheels, the combination of runners, aside of each of aforesaid toothed wheels, secured to each end of the axles, and of an elastic connecting rod on each side of the vehicle having its ends pivotally secured to the front and rear runners and being adapted to transfer a motion of the rear runners to the front runners, said connecting rod being broken between its connection points with the runners and having one of its ends formed into a sleeve, the other end sliding within said sleeve with a spring interposed between the two ends within the sleeve.

In testimony whereof, I have signed my name to this specification this tenth day of February, 1923.

BARBALA VILMANYI.